United States Patent
Caffary, Jr. et al.

(10) Patent No.: US 7,190,478 B2
(45) Date of Patent: Mar. 13, 2007

(54) NETWORK PRINTING TRACKING SYSTEM

(76) Inventors: Robert G. Caffary, Jr., 178 Preston Rd., Jewett City, CT (US) 06351; Thomas J. Love, 5 Upper Heatherwood, Cromwell, CT (US) 06416; Paul F. James, 88 Palmer Dr., South Windsor, CT (US) 06074

( * ) Notice: Subject to any disclaimer, the term of this patent is extended or adjusted under 35 U.S.C. 154(b) by 887 days.

(21) Appl. No.: 10/156,648

(22) Filed: May 29, 2002

(65) Prior Publication Data
US 2003/0223092 A1    Dec. 4, 2003

Related U.S. Application Data

(60) Provisional application No. 60/293,870, filed on May 25, 2001.

(51) Int. Cl.
*G06F 15/00* (2006.01)
(52) U.S. Cl. ..................... 358/1.15; 358/1.13
(58) Field of Classification Search ............. 358/1.15, 358/1.13
See application file for complete search history.

(56) References Cited

U.S. PATENT DOCUMENTS 5,787,149 A * 7/1998 Yousefi et al. ........... 455/422.1
6,832,250 B1 * 12/2004 Coons et al. ............... 709/224

OTHER PUBLICATIONS

Print Audit Website, Aug. 1, 2000, 12 pages.*

* cited by examiner

*Primary Examiner*—Kimberly Williams
*Assistant Examiner*—Lam Andrew
(74) *Attorney, Agent, or Firm*—Ober/Kaler c/o Royal W. Craig

(57) ABSTRACT

A system of hardware, software and a business method that enables printer and copier vendors to outsource network printing. The method is implemented on a local area network including a server PC, a plurality of connected client PCs, and a plurality of printers each networked through a secure network connection device that communicates only with Secure Print Servers. The business method comprises the steps of running Assessment Software over a test interval to determine a customer's printer cost per page, making an outsourcing proposal to the customer based on the customer's printer cost per page and a predetermined rationalization of printer layout, conducting a network survey to determine the customer's network characteristics, and installing print job tracking software on secure print servers attached to the customer's network. The print job tracking software captures all print traffic and automatically sends print job data to a secure web-site database for review by Dealers and Customers.

3 Claims, 7 Drawing Sheets

NETWORK PRINTING TRACKING SYSTEM

CROSS-REFERENCE TO RELATED APPLICATIONS

The present application derives priority from U.S. Provisional Patent Application No. 60/293,870 for "NETWORK PRINTING TRACKING SYSTEM"; Applicants: Robert G. Caffary, Jr., Thomas J. Love & James, Paul F.; filed: May 25, 2001.

BACKGROUND OF THE INVENTION

1. Field of the Invention

The present invention relates to network printer management and, more particularly, to a system of hardware, software and technical, business and marketing methods that enables printer and copier vendors to outsource network printing for mid size and small organizations and departments of large organizations using a combination of local and remote monitoring tools.

2. Description of the Background

The laser printer market includes computer printer manufacturers such as Hewlett-Packard, Lexmark and Epson, as well as high-end copier manufacturers, such as Xerox and Ricoh. Companies such as Canon maintain a strong presence in both the laser printer market and the copier market.

The computer printer oriented companies have a low-margin, high-volume channel oriented sales approach. The copier oriented companies tend to have a high-margin lower-volume direct sales force oriented approach. There is a trend in both camps to find a median position, and the high end is moving down and the low end up. Independent dealers that represent these companies tend to follow their company's models. Copier oriented dealers tend to be low volume high margin operations, and focus almost exclusively on the corporate copier/fax market. They tend to have little or no network and laser printer support experience, and a higher cost model, including higher-cost sales and service personnel. A substantial portion of their profits come from hardware sales and leasing. Printer oriented dealers tend to be lower-cost higher-volume operations with little expertise in dealing with high-cost copiers. They usually focus on supporting laser printers attached to computer networks. Their profits come from the sale of toner and other supplies and service. Both ends of the spectrum face margin pressure, and one solution for high-end manufacturers has been outsourcing. By engaging in long term outsourcing contracts with Fortune 1000 companies, these companies lock out the competition. Outsourcing has not spread among the low-end dealers (both laser oriented dealers and copier oriented dealers) because they lack the marketing infrastructure and technical networking know-how to make outsourcing work. The lower-end vendors could greatly benefit from outsourcing arrangements: they could lock in customers, lock out competition, increase margins by providing services. This would require a significantly different (more economical) business model plus the underlying system of hardware and software to implement it.

Existing network technology offers a path to accomplishing the foregoing. A primary goal of local area network (LAN) technology is to share all resources that are distributed across the network. Existing network software helps network administrators to accomplish this purpose. For example, Microsoft® Windows NT® Server 4.0 allows administrators to give anyone in their organization access to resources available on a Windows NT Server system. There is one resource that remains very difficult to manage. Specifically, printer management in networks is still an elusive goal. This is primarily due to the complexities in managing the diverse operating systems of the client computers, and the numerous printer drivers required for each different type of printer and for each different operating system, and the management problems created by a mixture of end-user attached and network attached printers. Printers that are attached directly to an end-user's computer are not easily installed, configured or removed. In order to install and use a new printer on an end-user's computer, the device driver must be installed from the computer itself, the port must be configured and the device mode settings (such as page size) must be manually set.

There are numerous obstacles faced in central printer management. Within a typical LAN a plurality of client terminals are connected to respective network Servers via any of a number of different communication topologies inclusive of 10-base T, 100-base T, Sonet, Token Ring, etc. Clients terminals might be configured to communicate with their assigned Servers via any of a number of different communication protocols such as IPX/SPX, TCP/IP, etc. In addition, Clients might be running any of various operating systems such as MacIntosh, Windows 95, 98 or Windows NT Workstation. Moreover, any number of different printers may be connected to the LAN, each requiring a different printer driver specially configured depending on the above constraints. If there are 100 client stations each with printers attached, and there are 5 servers, then there would need to be 500 printer configurations defined and maintained. The management of client printer configurations has traditionally been a manual process and all printer drivers must be manually installed and network connections manually established. This is accomplished by the administrator physically working with each client station connected to the LAN, and the impracticality of the situation becomes apparent.

There are a number of prior art references that are generally concerned with printer resource management.

For example, U.S. Pat. No. 5,819,015 to Martin et al. shows a networked system using a host computer that can be utilized by a user or a Network Administrator to "read" the contents of each printer memory connected to the network.

U.S. Pat. No. 5,993,088 to Nogay shows a method for optimal use of print resources during the preparation a print job for printing. During the creation of a spool file the invention logs data on print resource usage (such as font types and frequency) in a print job in an accounting file. Upon review of this data, it modifies the print resource usage data in the accounting file as necessary to optimize print resource usage. The spool file and the accounting file are then sent to a printer driver. The printer driver knows how to use the print resource data in the accounting file to optimize the print resource usage.

U.S. Pat. No. 5,935,262 to Barrett et al. shows a print interface device between a local area network (LAN) and a printer and which can output a log file. The device includes a LAN interface for receiving image forming jobs and command signals from the LAN, and a peripheral interface for outputting image forming jobs to the printer. The network device further includes a storage device that stores a log file of print jobs received from the LAN. The device includes a processor that updates the stored log file based on the image forming jobs received from the LAN. The processor is capable of formatting the log file into a print job and outputting the formatted log file to the printer.

U.S. Pat. No. 6,003,069 to Cavill shows a client/server printer driver system including a client-side subsystem capable of dividing the print job into portions to be processed client-side.

U.S. Pat. No. 5,794,035 to Golub et al. shows a system for managing input/output (I/O) resources in a computer system. The system includes a hardware resource manager which tracks the use of the I/O resources. In addition, the hardware resource manager (HRM) can allocate the resources between device drivers and provide a standard implementation to be used by device drivers. The HRM manages resources, arbitrates requests for print resources, and eliminates bottlenecks.

U.S. Pat. No. 5,699,493 to Davidson et al. shows a printing system having a host computer and a printer in which the printer acquires print job accounting information and communicates it to the host computer via NPAP messages. A host computer downloads print job data to the printer through a communications port on the printer (i.e., either a parallel port, serial port, or network port), and as the printer prints the print job that it received from the host computer, the printer temporarily stores job accounting information. At the end of the print job, the printer communicates that job accounting information back to armed host computers via a bi-directional communications port, including typical information such as: the job identifier number, job processing time, number of sheets of paper from each paper source, number of impressions from each paper source (either one-sided or two-sided impressions), the port identifier, the network user name, the name of the print job (as specified), and the printer's serial number.

U.S. Pat. No. 5,727,135 to Webb et al. shows bidirectional communications between a host computer and a selected printer connected to the host, to provide a user of the host with access to a substantially real-time, visual and functional replica of the operator panel of the selected printer. A user at the host computer may also visually monitor the status of multiple printers at the same time from the same host display.

Although all of the above-referenced patents suggest printer management in a LAN context, they are meant to attach to a single printer to monitor datastream going to the printer. They do not teach or suggest residency in a PC and monitoring all printers to which that PC prints. In addition, some require brand-specific hardware. Thus, they are incapable of adapting the printer monitoring mechanics for an outsourcing model in which print control is web-enabled to provide marketing and analysis information to vendors, and is hardware-vendor neutral. It would be greatly advantageous to provide Assessment Software that places full printer management information onto the web, inclusive of the actual cost per page for the customer, thereby facilitating a business method that outsources the customer's printing on a cost per page basis.

SUMMARY OF THE INVENTION

It is, therefore, an object of the present invention to provide a system of hardware, software and a business method that enables printer and copier vendors to out-source network printing for mid size and small organizations and departments of large organizations.

It is still another object to provide a business method comprising the steps of running Assessment Software over a test interval to determine a customer's printer cost per page, making an outsourcing proposal to the customer based on the customer's printer cost per page and a pre-determined rationalization of printer layout, conducting a network survey to determine the customer's network characteristics, and installing Print Job Tracking Software on provided Secure Print Servers attached to the customer's network.

It is still another object to automatically post the print information to a database maintained on a secure website.

According to the present invention, the above-described and other objects are accomplished by providing an internet-based System of software, hardware and technical, business and marketing services that enables printer and copier vendors to outsource network printing for mid size and small organizations and departments of large organizations. The System includes Assessment Software that is installed on a network, reports all print traffic, provides cost analysis, and removes itself from the network entirely invisibly to the end user. The Assessment Software requires no changes to the network or any network servers to perform its tasks. The permanent Print Reporting Software monitors all print traffic passing through the Print Server Computers (and, where necessary to capture print traffic directed to locally attached printers, client PCs) on which it is installed. The Print Server Computer communicates with secure printer network connection devices hosting one to three printers (or copiers, multifunction devices, etc.). All network print traffic flows through the System print servers and is recorded by the System Print Reporting Software. Where necessary, local print traffic is captured by the same System Print Reporting Software installed on the necessary client PCs. The System Print Servers also have security software installed that prevents any modifications to the software running on the System print servers. This security software allows the customer's IT staff to manage printers, print queues and end-users, but prevents changes to the System print servers and their installed software that would interfere with their print traffic monitoring function. The print server devices are configured to accept print jobs only from the System print servers (to avoid unmonitored printing). The System print reporting software (both when installed on a Print Server and on a client PC) transmits print data in real time from the System print servers to databases maintained on a remote website. This provides real time accounting for vendors using the System and also provides an income source from control over the print data. The System also provides the vendor with a service database and field employee tracking system. The vendors's control over delivery of service to the customer is greatly improved.

BRIEF DESCRIPTION OF THE DRAWINGS

Other objects, features, and advantages of the present invention will become more apparent from the following detailed description of the preferred embodiment and certain modifications thereof when taken together with the accompanying drawings in which:

FIG. 4 is a screen print of the Assessment Database PC Software navigation screen.

FIG. 6 is a screen print of the Assessment Database PC Software Data choices.

DETAILED DESCRIPTION OF THE PREFERRED EMBODIMENTS

The present system is a complete web-based system inclusive of a novel business method built upon an architecture including software and hardware that enables printer and copier vendors to outsource network printing for mid size and small organizations and departments of large organizations. The business method and underlying architecture are herein described.

A. The Business Method: Transaction-based Outsourcing

The present method outsources printer management in return for a price that is based on transaction volume, for example a penny a page. Many customers have inefficient printer setups that can cost them as much as 25 cents per page. An efficient customer, on the other hand, should have variable printing costs in the 2.5 cent per page range. An outsourcing arrangement with a per page cost allocating the savings is a powerful selling proposition. This model has significant advantages over traditional sale revenue models:

Dealers convert short term service/supply relationships into long term outsourcing arrangements providing a more stable revenue stream;

Palatability to Dealers: their payments to the Contractor track their success;

Stable Revenue Stream to the Contractor: the Contractor's revenue streams are tied to activity and not to a software upgrade cycle;

Outsourcing Model: the Contractor's revenue stream works with the dealer's outsourcing model.

The outsourcing entails the implementation of the present system (server and software), plus a Contractor web site (to be described). Printers and associated printer communication devices are leased to the customer. Lease charges to the customer for hardware is an essential guard against excessive printer demand by customers.

Figure 1:
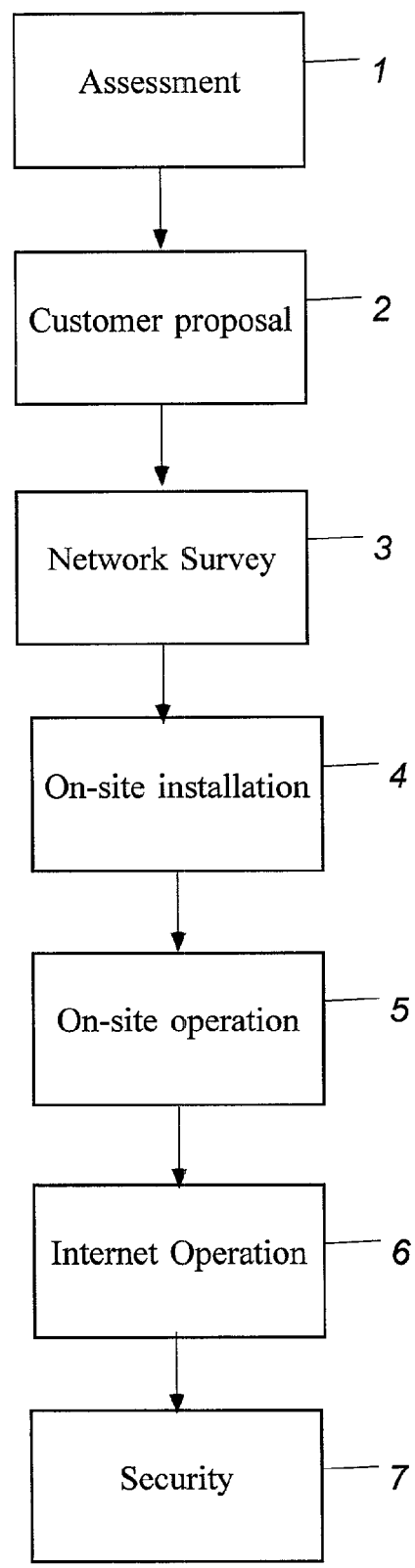
FIG. 1 is a flow chart illustrating the seven basic steps for implementing transaction-based print outsourcing.

In order to implement the above-described transaction-based outsourcing, the present business method entails six basic steps as shown in the flow chart of FIG. 1: 1) assessment; 2) customer proposal; 3) network survey; 4) on-site installation; 5) on-site operation; 6) internet operation; and 7) security.

Step 1: Assessment

The first step of the present method is to determine the customer's cost per page. This involves compiling a physical inventory of the customer's printers, and then running the present Assessment Software (as will be described) over a suitable study period, typically one month to three months, on client PCs on the customer's network. The Assessment Software according to the present embodiment is a client based, 32 bit Windows application. It is extremely simple to use, self-install, self-uninstalls, requires no changes in the customer's network and transmits all client printing activity statistics to a central Assessment Software database on a secure basis. The Assessment Software compiles information in a central assessment database which can be located on a customer PC or on a remote web site. The Assessment Software allows the determination of an accurate cost per page for the customer. This allows the customer to enter into a cost per page contract as described above that cuts the customer's cost per page and leaves the customer with a profit margin. The overall assessment step also allows the customer to determine the salvage repurchase cost of the customer's existing printer inventory. At the end of the assessment period, the client PC software uninstalls itself from the client PCs.

Step 2: Customer Proposal

Based on the information gained in step 1 plus a predetermined rationalization of printer layout, the Contractor (or dealer) can now make an outsourcing proposal to the customer. The pre-determined rationalization of printer layout is a set of guidelines such as follows: printers are located more rationally (25 foot radius to each employee), reduction and consolidation of color printers and ink jet printers, one server per no less than ten printers, calculation of new laser, ink jet and color cost per copies.

replacement of old, less efficient printers with new larger capacity printers. In addition, all local printers are replaced with network-attached printers.

Step 3: Network Survey

Assuming that the proposal is accepted, a network survey is conducted. This is to determine whether TCP/IP is in use, whether Windows 2000 network print servers can be installed, whether the servers will have access to the Internet, and subsidiary issues like ethernet/token ring, use of DHCP, range of available IP addresses, login issues such as domains and integration with Novell. This survey ensures that the present system can be deployed, and allows the Contractor to preconfigure all the servers and printer connection devices to be delivered. Preferably, the Contractor (or dealer) personnel conduct this survey remotely by providing the customer's IT staff with a questionnaire and by confirming details with the customer's IT staff.

Step 4: On-Site Installation

Once the necessary information is collected, secure PC print servers and secure print connection devices are pre-configured (e.g., by the contractor for the customer). This entails each PC print server being pre-loaded with Print Job Tracking Software (to be described). The PC print servers and secure print connection devices are then shipped for installation on-site, thereby keeping on-site problems at a minimum through this pre-configuration process. New printers are independently delivered and connected, and the system is tested to ensure all the pieces are working correctly. As the contractor system uses the same software and hardware configurations (Windows 2000, etc.) the only configuration issues on-site relate to network hardware (ethernet v. token ring) and network software issues (IP addresses) and are easily resolved. In order to avoid customer disruption, installation occurs on a one-printer-server-at-a-time basis. Also, it is expected that the customers IT staff will reconfigure the client PCs to link to the new printers, and an installation in stages reduces the workload for the IT staff, and localizes potential problems. In detail, first, a print server is installed. It is tested to ensure that it properly logs into the network, and can connect to the Internet and communicate with the Contractor web site (described below). Customer IT staff are given passwords necessary to log in the print server, back it up, and manage print queues. Second, the printers are installed, and connected to the printer connection devices. The number of printer connection devices required depends on the physical proximity of the printers and rationalization of layout (for example, a rational layout is a 25 foot radius to each employee. The printer connection devices are password protected and accept print jobs only from the associated Print Server's IP address, guarantying accurate page counts. Third, end user PCs are reconfigured to point their printer entries at print queues on the Print server. Jobs are printed to ensure the correct installation of the components. Once these steps have been completed, the process are repeated for each of the remaining Print Servers.

The Print Tracking Software is installed on those remaining client PCs that still have directly attached printers. These printers may be configured locally for security or other purposes. The goal is to reduce these printers to the minimum possible.

Step 5: On Site Operation

Given proper installation as per the above, all print jobs pass through the secure Print Servers and all print related data for each job is captured by the Print Job Tracking Software installed on the Secure Print Servers. The Secure Print Server-based Print Job Tracking Software will then report page counts hourly to the central web site database. This communication is encrypted and secured. The communication may be via Secure Socket Layer (SSL), also referred to as "Netscape encryption." SSL allows a Web browser to securely communicate with a virtual server through an encrypted session. SSL is a conventional way to transfer sensitive information over the internet. Alternately, the communication may be via a virtual private network (VPN) which uses encryption and tunneling to connect users or branch offices over the Internet. The Secure Print Server will also provide warnings for toner and maintenance kits. The client PCs with locally attached printers have their print jobs tracked by locally installed versions of the Print Tracking Software and the related data likewise transmitted to web site database.

Step 6: Internet Operation

The Contractor web site consists of a decryption/categorization software engine/Web-enabled database and secure access for dealer/customers. Encrypted data is automatically uploaded from Secure Print Servers hourly. The Contractor web site processes incoming print data by dealer and customer, and incorporates the data in the appropriate database. The data is then accessible on a secure basis by each dealer, for billing and operational purposes. In addition, on-site dealer service staff can send additional service data to the Contractor web site on a secure basis, from the Secure Print Servers. This data is likewise categorized by dealer and customer and incorporated in the appropriate database for presentation to the dealer.

Step 7: Security

The above-described business method is prone to two security risks: interference with page counts and interference with print servers. The present print servers are protected against modification by a layered approach consisting of Windows 2000 built-in security, standard Internet firewall Operating System security software, and hardware controls (BIOS configurations to prevent floppy boots, open PC cases, etc.). Moreover, the present printers are connected to print connection devices (e.g. HP jet direct devices and other similar devices) that are configured to communicate only with the present print server through the print server's IP address. The print connection devices are password protected, and this ensures an accurate page-count.

Data being distributed over the Internet is protected by encryption and username/password security utilizing Secure Sockets Layer.

In addition, periodic sample audits of page counts on selected printers are performed to ensure that printer page counts match the printer database counts. This prevents efforts to steal services on-site by simply disconnecting printers from present hardware and re-connecting the printers directly to the customer's network.

The seven above-described steps of assessment, customer proposal, network survey, on-site installation, on-site operation, internet-operation and security facilitate transaction-based outsourcing in accordance with the present invention.

B. The Architecture

Figure 2:
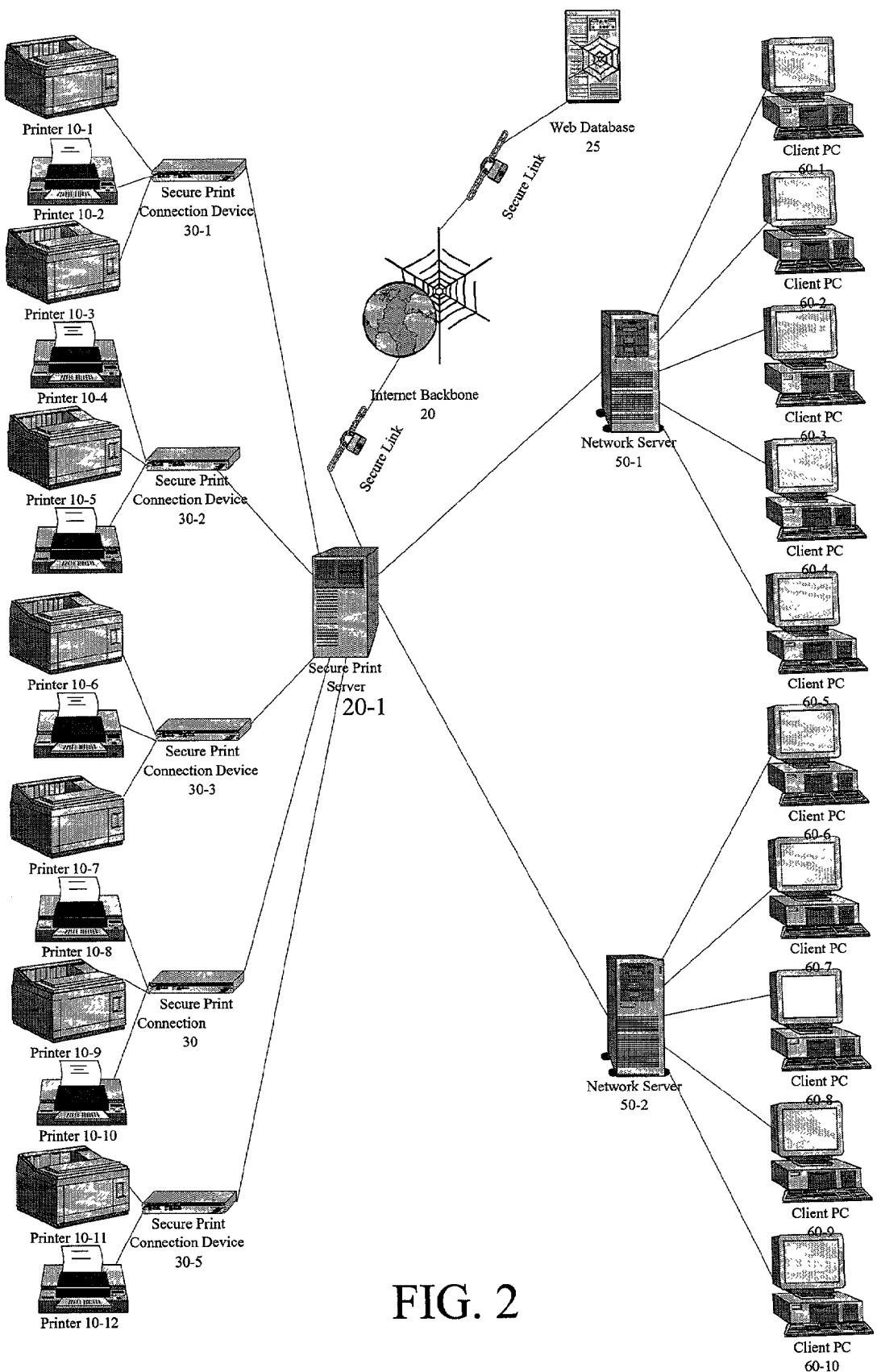
FIG. 2 is a network diagram illustrating the transaction-based print outsourcing system.
Figure 3:
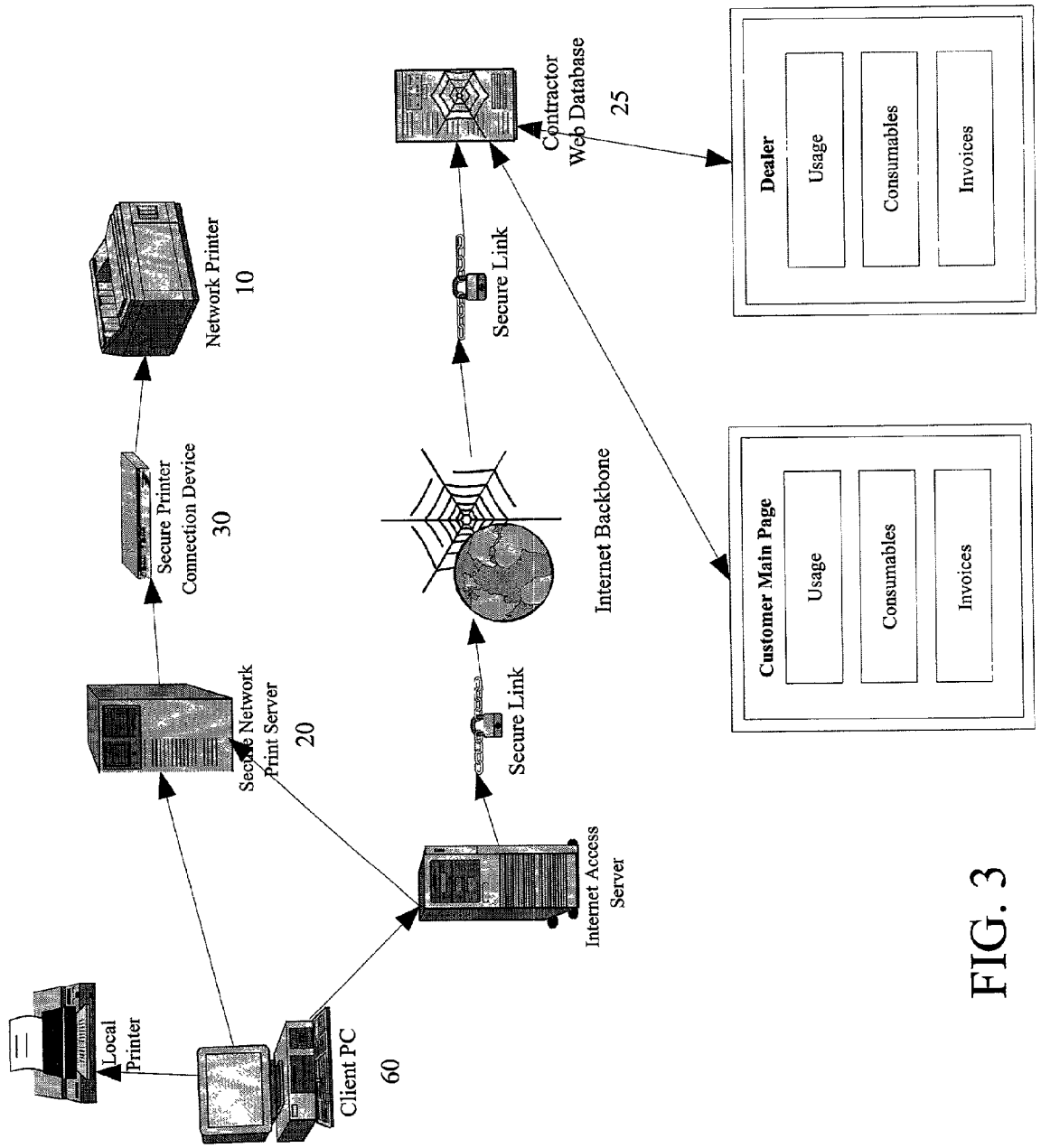
FIG. 3 is a diagram showing the details of the data flow from a client PC through a Print Server and then to the web database.

As is apparent from the above the system architecture relies on three control points: 1) on-site print servers 20-1 . . . n; 2) secure printer/network communication devices 30-1 . . . n; 3) a Contractor web site 25. The three control points are better shown in FIGS. 2 and 3, which are a network diagram illustrating the transaction-based print outsourcing system, and a flow diagram showing the details of the data flow from a client PC through a Print Server and then to the web database, respectively.

on-site print servers 20-1 . . . n communicate with the secure printer connection devices 30-1 . . . n controlling the printers 10-1 . . . n (as well as copiers and fax machines), while running password protected Print Job Tracking Software providing print job tracking and secure communication through the Internet to a Contractor web site 25 using encrypted communications;

secure printer/network communication devices 30-1 . . . n to control communication with printers 10-1 . . . n.

the Contractor web site 25, which hosts the print activity database and service database for all the customers.

A. Client PC Software

The Client PC Software is resident on each client PC 60-1 . . . n during the assessment period only.

The Assessment Database Software is installed on only a single client PC, for example, PC 60-1. This software then generates the Client PC software, which is then distributed to all the other Client PCs 60-2 . . . n, with a predetermined uninstall date set, to coincide with the end of the assessment.

The Client PC Software serves to invisibly monitor print traffic on that client and collect data for use in the assessment. Each time a print job is created on any Client PC 60-1 . . . n, the Client PC Software device driver intercepts the job instantaneously and temporarily stores the data in a file on the Client PC. Periodically, the Client PC Software moves this temporary file in an encrypted file in the Client PC Software installation directory named during the installation of the software. Encryption is essential to prevent tampering and/or unauthorized use of the data. The Client PC Software then transmits the encrypted data to the Assessment Database Administrative PC on a variable time schedule that varies in accordance with print activity and is intended to minimize network traffic. For instance, if there is no print activity, then the Client PC Software reporting schedule will slow down to a minimum frequency. It has been found that a ranges of from every 11 seconds to every 11 minutes is suitable.

One hour after installation and once a week thereafter, the Client PC Software sends an inventory of all printers installed on the Client PC to the Assessment Database PC.

The Client PC Software installs temporary software device drivers in the Windows printing sub-system on the PCS. These device drivers duplicate the function of the default Windows device drivers and are invisible to the Client PCs 60-1 . . . n, but in addition, track and record all print job related data, each time a print job is printed on a client PC 60-1 . . . n to a locally attached printer, or a server-attached printer, or to remote network printers communicating either by TCP/IP protocol or IPX/SPX protocol. The Client PC Software then encrypts this data and sends it using TCP/IP

B. Assessment Database PC Software

The Assessment Database Software is resident on a selected Client PC 60. The Assessment Database Software continuously collects the data sent by the Client PCs 60-1 . . . n. The Assessment Database Software does this at all times once it is installed. All assessment data is stored in a separate PRINTDATA.MDB file. This assessment data file can be moved to another Client PC 60 so long as it has the Assessment Database Software installed on it. If the Administrative PC is not running, then the Client PCs 60-1 . . . n will store their data individually until the Assessment Database PC is back online.

The Assessment Database Software installs two other programs on the Assessment Database PC, which run at all times, to ensure that data sent by Client PCs 60-1 . . . n is captured even when the Assessment Database Software is not running. First, the Get program collects data sent to a shared directory assigned for use by the Assessment Database Program upon installation. Second, the TCP/IP program collects data sent through TCP/IP. These two programs run automatically whenever the Assessment Database PC is started. They are automatically removed when the Assessment Database Software is uninstalled.

At least the following data is sent by the Client PC software and stored in the Assessment Database:
PrinterName
MachineName
DriverName
Location
UserLogon
MachineName
DocumentName
DataType
Copies
FileSize
Submitted
PagesPrinted In addition, the following data may be captured
Orientation
Paper Size
Paper Length
Paper Width
Scale
Print Quality
Yresolution
Color
Duplex
TTOption Given the foregoing data collected from all the Client PCs, a user can logon to the Assessment Database PC Software and generate a variety of reports.

Figure 4:
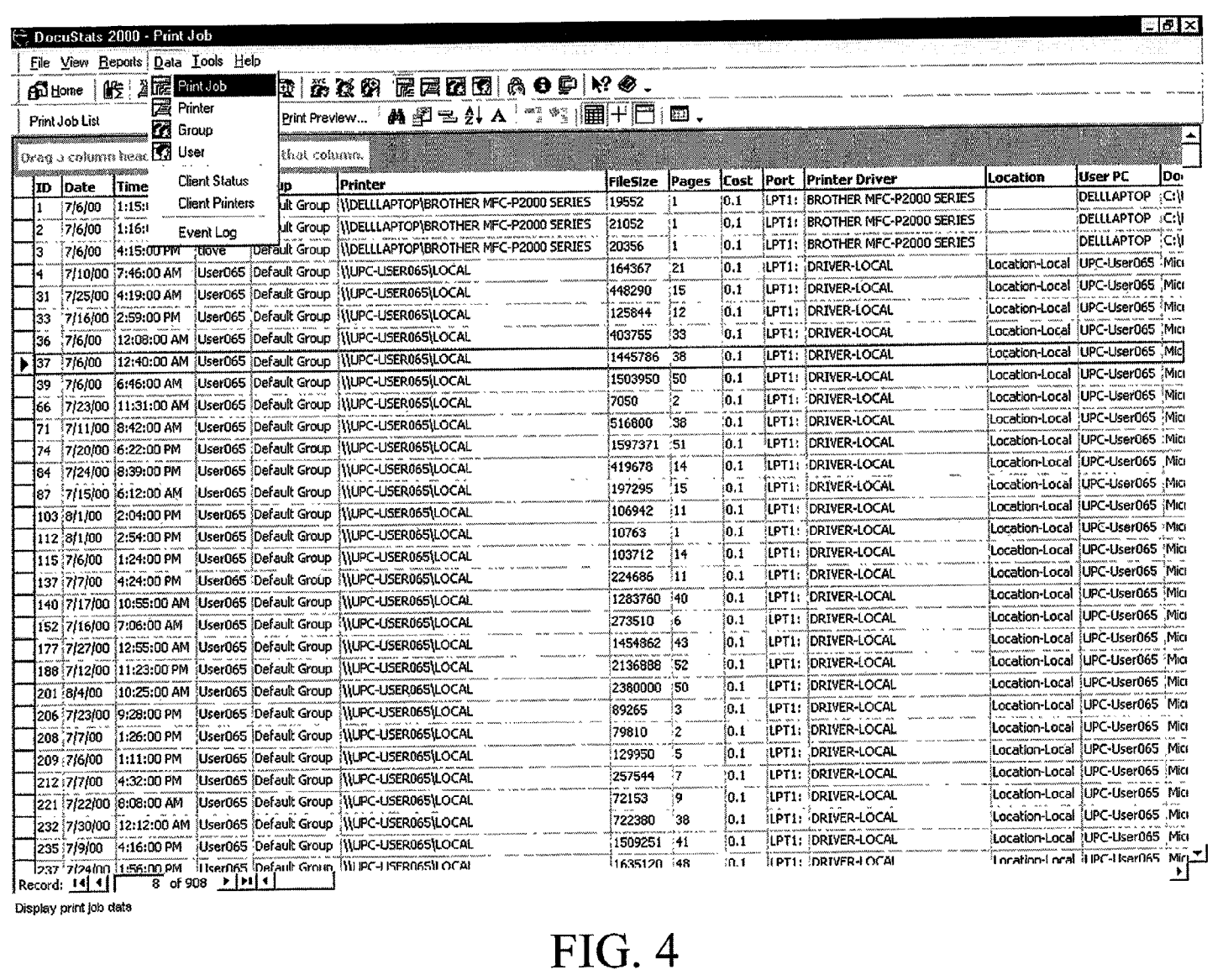

FIG. 4 is a screen print of the Assessment Database PC Software navigation screen. The navigation screen includes a text-based menu selection tree at top, and an alternate series of graphical icons immediately beneath.

The File command allows the administrator to Open or Close the administrative information file in the shared directory.

The View command allows the administrator to selectively show (or not) the alternate series of graphical icons for navigation, immediately beneath the text menu, and the bottom-most status indicator bar that gives the status of the program, the date and time.

Figure 5:
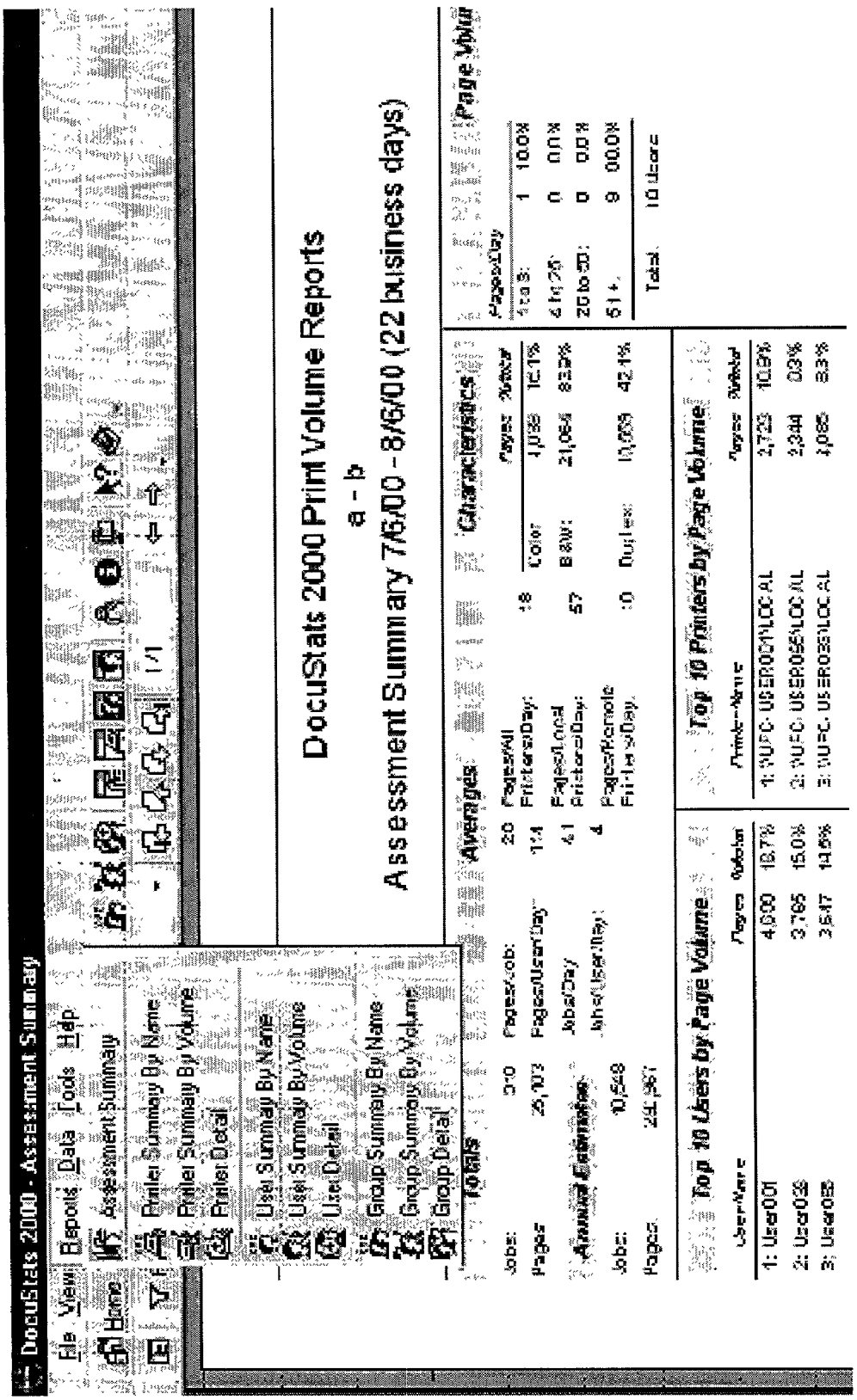
FIG. 5 is a screen print of the Assessment Database PC Software Report choices.

FIG. 5 is a screen print of the Assessment Database PC Software Report choices. This navigation screen includes multiple report choices for client printers, users and groups inclusive of the following: Assessment Summary, Printer Summary by Name, Printer Summary by Volume, Printer Detail, User Summary by name, User Summary by Volume, User Detail, Group Summary by Name, Group Summary by Volume, and Group Detail. The selection will invoke a data grid reflecting the corresponding information. Reports can be exported to RTF and PDF files.

Figure 6:
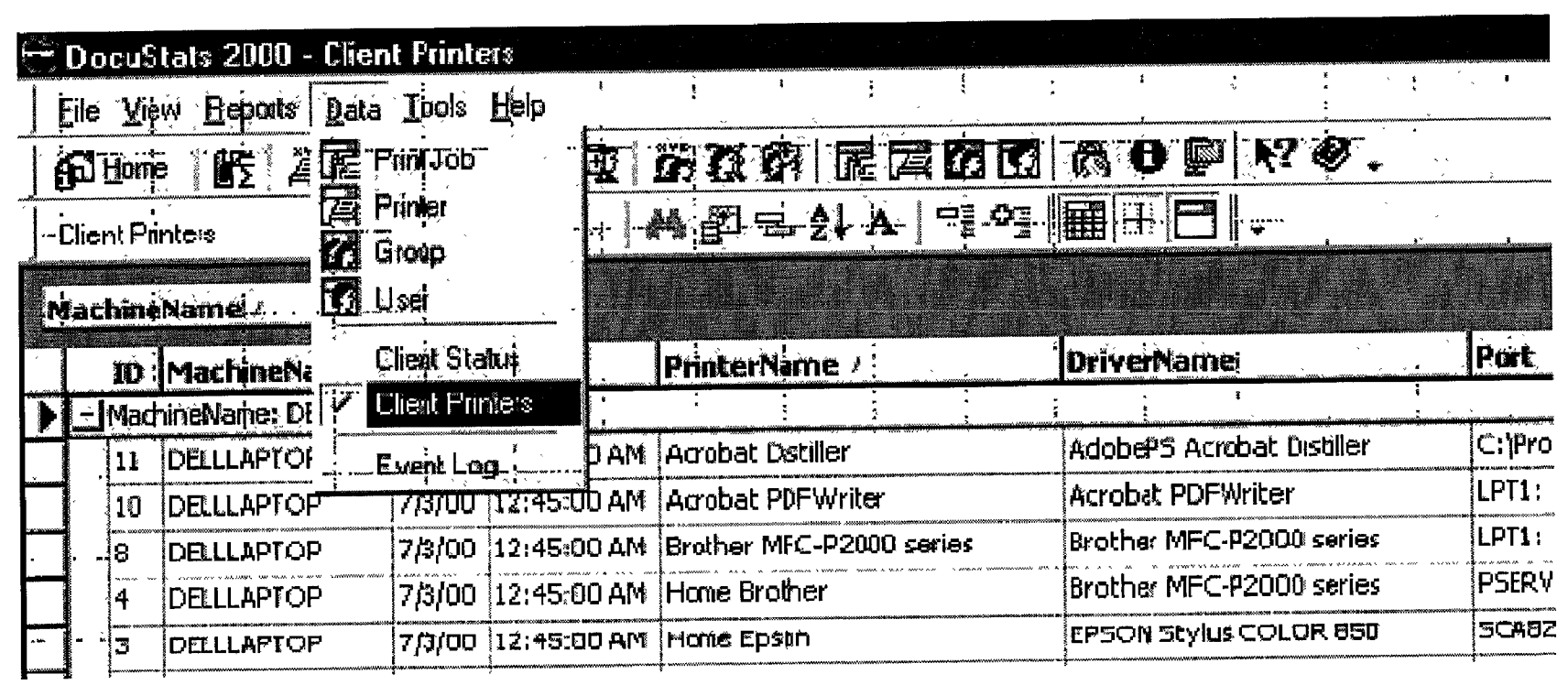

FIG. 6 is a screen print of the Assessment Database PC Software Data choices. During installation, and once per week thereafter, each Client PC sends an inventory of each printer installed on that PC. This inventory can be viewed by selecting Data>Client Printers.

The Assessment Database Software assigns a standard cost per page to all printers of $0.10. This can be changed for any printer by locating the printer in the Printers data grid and changing the value in the page cost column. Thereafter, the printer are reported with the new value.

The Group data grid is used to create groups. Groups are used to group users together (for example, into functional departments like sales, accounting). Once users are assigned to groups, data can be analyzed and printed by group.

The User data grid is used to list all the users who have sent print data and to assign users to groups for analysis purposes.

Each Client PC sends status messages to the Assessment Database PC. These messages are sent when the Client PC Software is installed, once a day thereafter, when the Client PC Software is uninstalled, and whenever the Client PC Software menu is accessed. To review these messages, the administrator selects Data>Client Status.

To review client printer information, the administrator selects Data>Client Printers.

Preferably, the Client PC Software checks for jobs once every 11–60 seconds, between the hours of 8 am and 7 pm local time, and once every 11–600 seconds outside of those hours. It first checks once every 11 seconds, and then if no job is printed on the Client PC, it slows down exponentially to the limit of either 60 seconds or 600 seconds, depending on the time of day. If the Client PC Software prints, then Client PC Software resets the poll time to 11 seconds and also stores the print job data in its directory on the Client PC in an encrypted temporary file. The Client PC Software then immediately tries to transmit it to the Server using first file copy, and then TCP/IP. However, if it uses TCP/IP, and Internet Explorer 4 or 5 is not installed and only Winsock2 is installed, then it transmits the data only once every 10 minutes. If file copy or Internet Explorer 4 or 5 is installed, then the longest it should take to see a job appear in the Assessment Database PC is about 2 minutes between 8 am and 7 pm local time, and if the local time is outside that period or Winsock2 is in use, the longest time it should take is about 11 minutes. All of the individual print job information communicated to the Assessment Database PC Software is available for viewing by selecting Data..Event Log.

Figure 7:
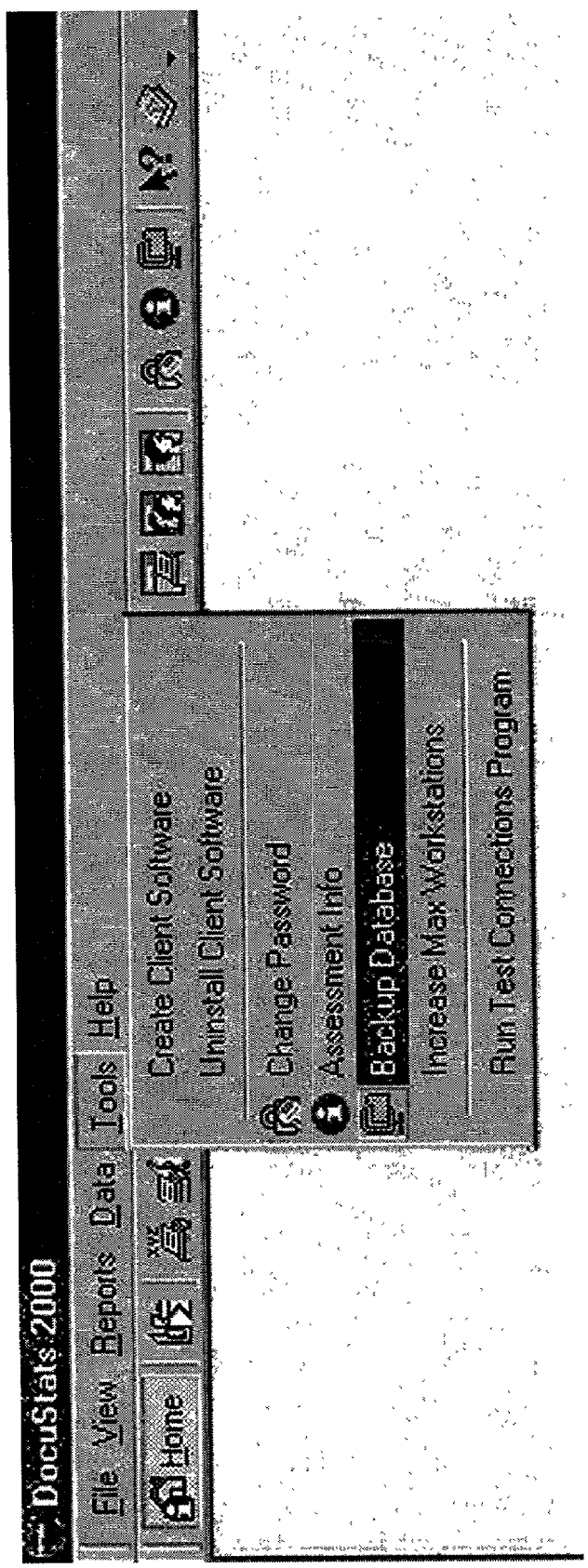
FIG. 7 is a screen print of the Assessment Database PC Software Tool choices.

FIG. 7 is a screen print of the Assessment Database PC Software Tool choices. End user configuration is the responsibility of the customer. The present servers are configured to allow management of printer usage, including user access, to be effected by the customers IT staff. Thus, the present software will remain substantially invisible to the IT staff. The customer's IT staff can manage the Client PC Software and Assessment Database PC Software the same as they would manage any other Windows 2000 print server.

C. Communication Link for Assessments

There are five necessary conditions that must exist for the Client PC Software to report print jobs to the Assessment Database PC: The Assessment Database Software must be installed and running on the network; the Assessment Database Software that is running on the network must be the same used to create the Client PC Software (mixing and matching from other installations will not work because each Client PC Software is tagged at creation for security purposes); the Client PC Software must be installed and running on at least one Client PC; the network must allow the Client PC to communicate with the Assessment Database PC on the network; and print jobs must be generated on the Client PC.

Given the foregoing constraints, the Client PC Software will use two methods of communication with the Assessment Database PC:

Method 1: file copy to a jointly shared directory, and
Method 2: TCP/IP.

Both methods are automatically used by the Client PC Software. Each time the Client PC Software attempts to transfer print data to the Assessment Database Software, the Client PC Software first attempts to use the shared directory (Method 1) and if the shared directory is unavailable, then attempts to use TCP/IP (Method 2). If both methods fail, then the print data is stored on the Client PC and the Client PC Software sends the stored print data on the next attempt. The Client PC Software attempts to send print data each time a print job is printed on the Client PC and once per minute thereafter. Either a shared directory or TCP/IP is necessary for the proper operation of the Client PC Software, but not both. The Client PC Software will use whichever is present. However, it is strongly recommended that a shared directory be created so that on networks where TCP/IP is available, both methods of data transfer can be used. The shared directory can be created on any Client PC or server on the network so long as the Assessment Database PC and the Client PCS can read, write and delete files in that shared directory. It is very important that all end users have read, write and delete rights to the shared directory. During initial installation, the Assessment Database Software attempts to create a shared directory on the Assessment Database PC as a convenience. An exemplary shared directory may be C:\PROGRAM FILES\ \SHARED, and it is assigned the share name PRINTDATA. If the Assessment Database Software fails to create the shared directory on the Assessment Database PC, it displays an error message.

D. Post Assessment—Permanent Operation

Once the assessment period is completed, the Assessment Database Software and the Client PC software is permanently removed from the customer's network and client PCs 60-1..n. Print Job Tracking Software is installed on the provided Secure Print Servers 20-1..n. This software is identical to the Client PC software described above, except that it has no predetermined uninstall date, and it transmits all print job data to the Contractor web site using TCP/IP. All print jobs passing through the Secure Print Servers is captured by the Print Job Tracking Software and transmitted to the Contractor web site. The data being transmitted is identical to the data transmitted by the Client PC Software. If locally attached printers are required by the customer, then additional copies of the Print Job Tracking Software will be installed on the related client PCs, and will also transmit print job data to the Contractor web site.

In addition, service personnel can access the web based database to enter service data such as time and date of visits, and services performed and parts consumed.

D. Centralized Web-enabled Database System

All print and service data are transmitted to a centralized Contractor database system 25 maintained by the Contractor. The web-based database 25 includes all of the information of the Assessment Database Software, and in addition divides data by Dealer and Customer, and provides service call tracking (dates, times, services and parts provided). This way, vendors and their employees will access this database using web browsers, across the Internet. Each vendor's database is maintained separately and require username/password access. This provides real time accounting for vendors using the present system. The present system also provides the vendor with the tools necessary to move their sales and service organizations into an outsourcing model: marketing and analysis software, server hardware and software, server support and Internet connectivity in a complete package. This enables vendors to move immediately into the foregoing business model while continuing to continue to focus on their printer service and supply strength. The present system allows vendors to change fundamentally the relationship between the vendor and its customers. The present system also provides the vendor with a service database and field employee tracking system, and customer control over delivery of service to the customer is greatly improved.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

What is claimed is:

1. A system for outsourcing network printer requirements, comprising:

a local area network including a server PC, a plurality of connected client PCs, and a plurality of printers each in communication with said local area network;

assessment software installed on the local area network and adapted to distribute and install Client PC software on each connected client PC, each Client PC software installation in turn replacing default printer driver software with substitute printer driver software that duplicates the function of the default printer driver software and additionally invisibly monitors print traffic data on said Client PC and captures print traffic data inclusive of UserLogon and all print related data for each print job for use in an assessment;

permanent print reporting software installed on said server PC for collecting said print traffic data inclusive of UserLogon and all print related data for each print job from each connected Client PC;

secure printer network connection devices which communicate with the server PC and that host local printers;

security software installed on the server PC which prevents any modifications to the software running on the server PC; and a contractor web site for hosting the print traffic data for all customers.

2. The system for outsourcing network printer requirements according to claim 1, wherein said secure printer network connection devices each host one to three said local printers.

3. The system for outsourcing network printer requirements according to claim 2, wherein said permanent print reporting software reports page counts periodically to a central database.

* * * * *